US012671679B2

(12) United States Patent
Basta

(10) Patent No.: US 12,671,679 B2
(45) Date of Patent: Jun. 30, 2026

(54) SYSTEMS AND METHODS FOR GENERATING AND USING SECURE SHARDED ONBOARDING USER INTERFACES

(71) Applicant: Stripe, Inc., South San Francisco, CA (US)

(72) Inventor: Matthew Basta, Chicago, IL (US)

(73) Assignee: Stripe, LLC, South San Francisco, CA (US)

( * ) Notice: Subject to any disclaimer, the term of this patent is extended or adjusted under 35 U.S.C. 154(b) by 0 days.

(21) Appl. No.: 18/544,900

(22) Filed: Dec. 19, 2023

(65) Prior Publication Data

US 2024/0121230 A1 Apr. 11, 2024

Related U.S. Application Data

(63) Continuation of application No. 16/943,759, filed on Jul. 30, 2020, now Pat. No. 11,902,266.

(51) Int. Cl.
*H04L 9/40* (2022.01)
*G06F 16/23* (2019.01)
(Continued)

(52) U.S. Cl.
CPC .......... *H04L 63/08* (2013.01); *G06F 16/2379* (2019.01); *G06F 21/33* (2013.01);
(Continued)

(58) Field of Classification Search
CPC ....... H04L 63/08; H04L 9/088; H04L 9/3263; H04L 63/04; H04L 63/062; H04L 63/068;
(Continued)

(56) References Cited

U.S. PATENT DOCUMENTS 6,360,254 B1 * 3/2002 Linden .................. G06F 16/955
707/E17.112
7,778,926 B1 * 8/2010 Grinchenko ........ G06F 21/6218
705/50

(Continued)

OTHER PUBLICATIONS

Ken Soong, et al., Optimizing New User Experience in Online Services, Feb. 3, 2019, IEEE, pp. 442-449 (Year: 2019).*

(Continued)

*Primary Examiner* — Nilesh B Khatri
(74) *Attorney, Agent, or Firm* — BAKERHOSTETLER

(57) ABSTRACT

A method and apparatus for generating and using secure sharded onboarding user interfaces are described. The method may include determining, based on account type of a merchant account being onboarded for a merchant by a first user, that information for a user type associated with a second user associated with the merchant is to be collected to satisfy minimum merchant account compliance requirements. The method may also include allocating a person object in an accounts data store maintained by the commerce platform system, the person object associated in the accounts data store with the merchant account. Furthermore, the method can include generating a secure link and transmitting the secure link to the second user, the secure link resolving at the commerce platform system and comprising a unique identifier that is associated with the person object. In response to receiving selection of the secure link by the second user, the method includes generating a secure application programming interface (API) based graphical user interface to collect account information for the person object associated with the unique identifier.

20 Claims, 6 Drawing Sheets

(51) Int. Cl.

| | |
|---|---|
| *G06F 21/33* | (2013.01) |
| *G06F 40/174* | (2020.01) |
| *G06Q 20/40* | (2012.01) |
| *G06Q 30/0601* | (2023.01) |
| *H04L 9/08* | (2006.01) |
| *H04L 9/32* | (2006.01) |
| G06F 3/04842 | (2022.01) |
| G06F 9/54 | (2006.01) |
| G06Q 40/03 | (2023.01) |

(52) U.S. Cl.
CPC ........... *G06F 40/174* (2020.01); *G06Q 20/40* (2013.01); *G06Q 30/0601* (2013.01); *H04L 9/088* (2013.01); *H04L 9/3263* (2013.01); *H04L 63/04* (2013.01); *H04L 63/062* (2013.01); *H04L 63/068* (2013.01); *H04L 63/102* (2013.01); *G06F 3/04842* (2013.01); *G06F 9/548* (2013.01); *G06Q 40/03* (2023.01); *G06Q 2220/00* (2013.01); *H04L 2463/082* (2013.01)

(58) Field of Classification Search
CPC ............. H04L 63/102; H04L 2463/082; G06F 16/2379; G06F 21/33; G06F 40/174; G06F 3/04842; G06F 9/548; G06F 16/901; G06F 16/90335; G06Q 20/40; G06Q 30/0601; G06Q 40/03; G06Q 2220/00; G06Q 50/18; G06Q 10/10; G06Q 30/018
See application file for complete search history.

(56) References Cited

U.S. PATENT DOCUMENTS

| | | | |
|---|---|---|---|
| 2003/0233327 A1 | 12/2003 | Keresman et al. | |
| 2007/0198373 A1 | 8/2007 | Metcalfe | |
| 2007/0220271 A1* | 9/2007 | Law | H04L 63/0838 |
| | | | 713/185 |
| 2008/0115227 A1* | 5/2008 | Toutonghi | G06F 21/6272 |
| | | | 726/29 |
| 2008/0208867 A1 | 8/2008 | Poston et al. | |
| 2009/0192915 A1* | 7/2009 | Fernandez | G06Q 30/00 |
| | | | 705/26.1 |
| 2011/0072039 A1* | 3/2011 | Tayloe | G06F 21/62 |
| | | | 707/769 |
| 2011/0173322 A1 | 7/2011 | Urbanek et al. | |
| 2011/0289011 A1 | 11/2011 | Hull et al. | |
| 2012/0260322 A1* | 10/2012 | Logan | G06F 21/33 |
| | | | 726/6 |
| 2013/0067594 A1* | 3/2013 | Kantor | G06F 16/9566 |
| | | | 726/28 |
| 2013/0097537 A1 | 4/2013 | Kimball et al. | |
| 2013/0173366 A1* | 7/2013 | Beighley, Jr. | G06Q 30/0214 |
| | | | 705/26.7 |
| 2014/0040456 A1* | 2/2014 | Bingell | H04L 69/329 |
| | | | 709/224 |
| 2014/0278821 A1 | 9/2014 | Mcconnell | |
| 2014/0282968 A1* | 9/2014 | Aboughanaima | H04M 3/38 |
| | | | 726/7 |
| 2015/0025911 A1* | 1/2015 | Altebrando | G06Q 10/10 |
| | | | 705/3 |
| 2015/0143468 A1* | 5/2015 | Hebert | H04L 67/12 |
| | | | 726/4 |
| 2017/0006008 A1* | 1/2017 | Moran | G06F 21/31 |
| 2018/0123998 A1* | 5/2018 | Gurung | H04L 51/52 |
| 2019/0190907 A1* | 6/2019 | Panus | G06Q 30/018 |
| 2019/0295072 A1* | 9/2019 | Jain | G06Q 20/385 |
| 2021/0168140 A1* | 6/2021 | Canfield | G06F 21/31 |
| 2022/0129869 A1 | 4/2022 | Schwekendiek | |

OTHER PUBLICATIONS

Dr. Sumanjeet, Emergence of Payment Systems in the Age of Electronic Commerce: The State of the Art, Nov. 24, 2009, IEEE, pp. 1-18 (Year: 2009).

* cited by examiner

400

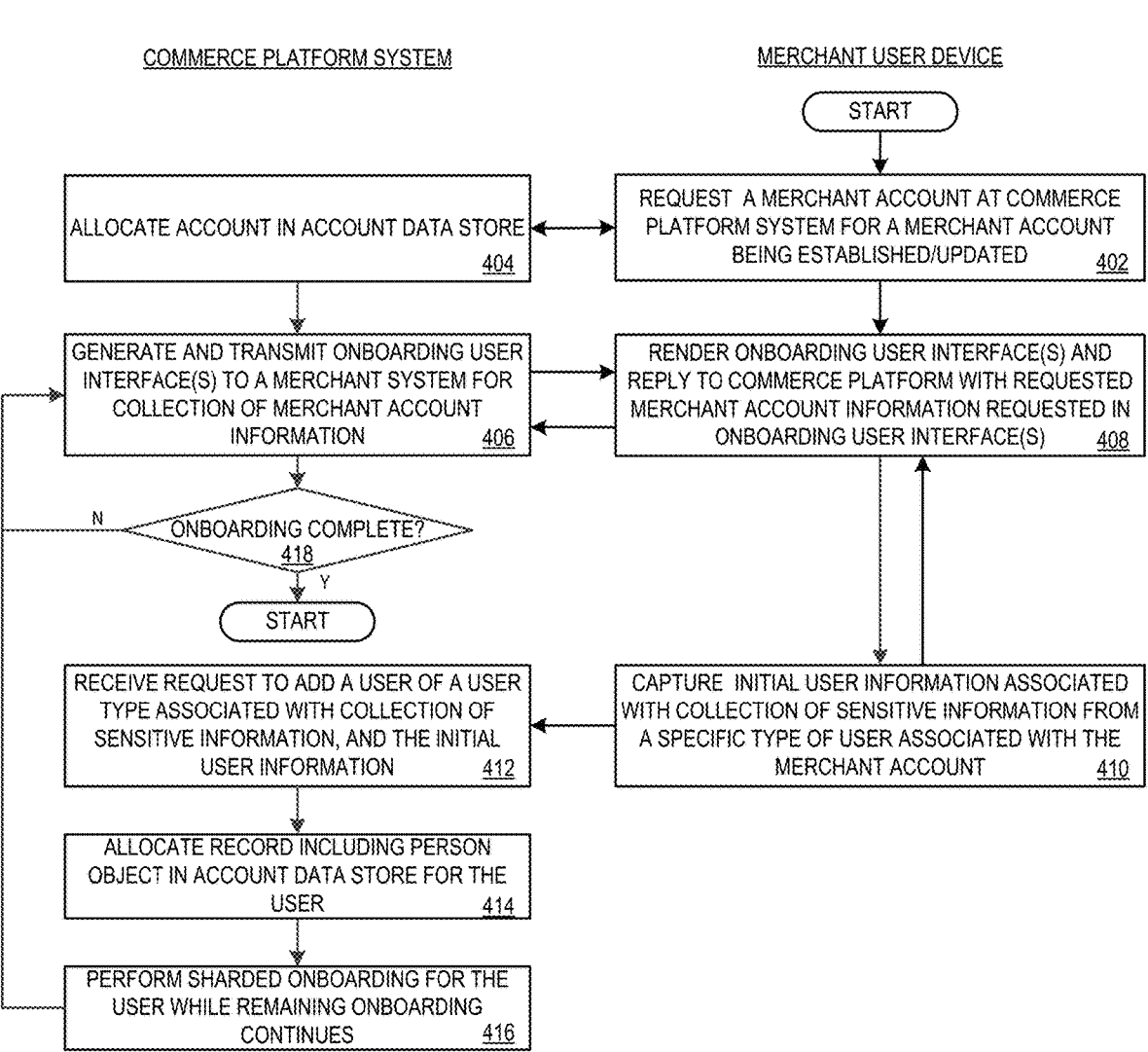

COMMERCE PLATFORM SYSTEM

MERCHANT USER DEVICE

START

REQUEST A MERCHANT ACCOUNT AT COMMERCE PLATFORM SYSTEM FOR A MERCHANT ACCOUNT BEING ESTABLISHED/UPDATED    402

ALLOCATE ACCOUNT IN ACCOUNT DATA STORE    404

GENERATE AND TRANSMIT ONBOARDING USER INTERFACE(S) TO A MERCHANT SYSTEM FOR COLLECTION OF MERCHANT ACCOUNT INFORMATION    406

RENDER ONBOARDING USER INTERFACE(S) AND REPLY TO COMMERCE PLATFORM WITH REQUESTED MERCHANT ACCOUNT INFORMATION REQUESTED IN ONBOARDING USER INTERFACE(S)    408

ONBOARDING COMPLETE?    418

N

Y

START

RECEIVE REQUEST TO ADD A USER OF A USER TYPE ASSOCIATED WITH COLLECTION OF SENSITIVE INFORMATION, AND THE INITIAL USER INFORMATION    412

CAPTURE INITIAL USER INFORMATION ASSOCIATED WITH COLLECTION OF SENSITIVE INFORMATION FROM A SPECIFIC TYPE OF USER ASSOCIATED WITH THE MERCHANT ACCOUNT    410

ALLOCATE RECORD INCLUDING PERSON OBJECT IN ACCOUNT DATA STORE FOR THE USER    414

PERFORM SHARDED ONBOARDING FOR THE USER WHILE REMAINING ONBOARDING CONTINUES    416

FIG. 4

USER DEVICE                                    COMMERCE PLATFORM SYSTEM

SYSTEMS AND METHODS FOR GENERATING AND USING SECURE SHARDED ONBOARDING USER INTERFACES

RELATED APPLICATIONS

This application is a continuation of co-pending U.S. patent application Ser. No. 16/943,759, filed Jul. 30, 2020, the disclosure of which is incorporated by reference herein in its entirety.

BACKGROUND

Merchants, such as grocers, car services, dry cleaning services, etc., provide their products and services to consumers. Such merchants often employ agents to deliver their products and/or provide the actual services. For example, a person acting on the merchant's behalf will drive a consumer in their own car, deliver food ordered through a merchant website, pick up and/or drop off clothes dry cleaned by the merchant, etc.

These merchants, although providing a system for supplying products and/or services to consumers through their agents, often do not perform the financial processing associated with the merchant transactions. Instead, merchants utilize commerce systems to process financial transactions for the products and/or services provided to consumers through their agents. This may include the merchant, agent, and other users establishing accounts with the commerce system. Once the accounts are established, merchants can run financial transactions using the services of the commerce system, the agents can accept payments from customers on behalf of the merchant for provided products and/or services, and the commerce system processes the accepted payments, performs payouts for services rendered, as well as other financial processing services. This processing may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant.

Establishing accounts, often referred to as onboarding, for new users to a commerce system is often associated with significant problems and potentially presents barriers to onboarding a new user. For example, account information across all account types for a commerce platform consists of a significant number of individual pieces of data, such as names, addresses, directorships, ownership, banking information, credit card information, citizenship, government identifiers, and so on. Each of these types of information may not be relevant to all account types, and thus requiring a user to provide non-relevant data may unnecessarily complicate and extend the onboarding process. More significantly, certain types of accounts, due to juristic requirements, banking and credit proprietor requirements, requirement of the commerce platform, or other requirements, may require that certain sensitive information be collected from specific individuals associated with an account. For example, an account type may require the collection of a chief executive officer's social security card number in order for the associated account to satisfy the account's requirements. As another example, a majority stockholder, company founder, etc. may be required to provide proof of identifying a jurisdiction by supplying a copy, image, etc. of an official identification, such as a government issued passport, driver's license, etc.

Such individuals' time is often very limited, and thus they often are not the account opener performing the onboarding. As a result, when their sensitive information is to be collected during account onboarding, they are reluctant to share it with the account opener out of data privacy concerns. Furthermore, in networked computing environments, they are also reluctant to use technical systems, such as email, text messaging, fax, etc., to transfer the sensitive information over a communications network due to security vulnerabilities associated with insecure communications channels, potential nefarious systems seeking to intercept sensitive data, etc. Therefore, to address such security problems associated with interactions over communications networks, technical solutions are required that provide guarantees of security in the information exchanged, and also in the information collected.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 4 is a flow diagram of one embodiment of a method for generating one or more user interfaces for onboarding a merchant for use of services of a commerce platform system.

DETAILED DESCRIPTION

Figure 1:
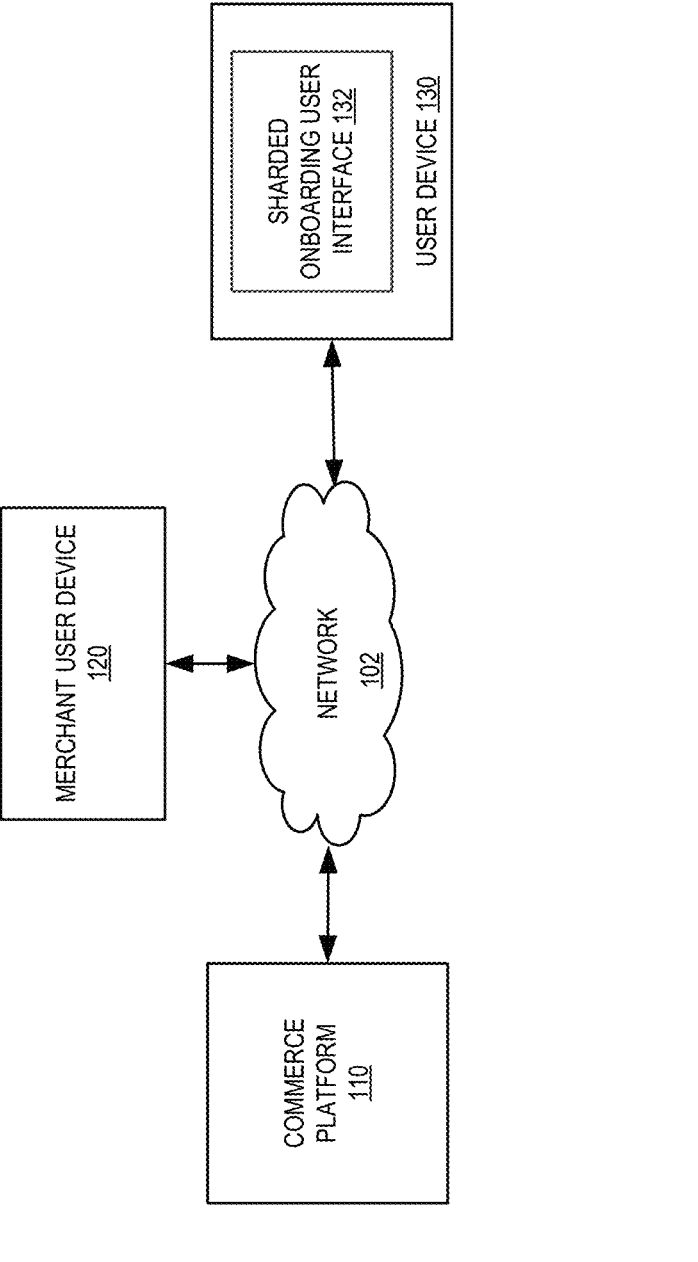
FIG. 1 is a block diagram of an exemplary system architecture for secure techniques for generating and using sharded onboarding user interfaces during account onboarding for a commerce platform.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "initiating", "generating", "serving", "establishing", "updating", "receiving", "transmitting", "rendering", "supplying", "allocating", "capturing", "requesting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for secure techniques for generating and using sharded onboarding user interfaces during account onboarding for a commerce platform. In one embodiment, the system 100 includes a commerce platform 110, a merchant user device 120, and user device 130. As will be discussed in greater detail below, the user device 130 is associated with certain merchant users, other than an initial account onboarding user using the merchant user device 120 to onboard the merchant, and for which sensitive information (e.g., a subset of account information) is to be collected during account onboarding.

In one embodiment, user devices (e.g., devices 120 and 130) may be mobile computing devices, such as a smartphone, tablet computer, smartwatch, etc., as well computer systems, such as a desktop computer system, laptop computer system, server computer systems, etc. The commerce platform 110 may also be one or more computing devices, such as one or more server computer systems, desktop computer systems, etc.

The commerce platform 110, merchant user device 120, and user device 130 may be coupled to a network 102 and communicate with one another using any of the standard protocols for the exchange of information, including secure communication protocols. In one embodiment, one or more of the commerce platform 110, merchant user device 120, and user device 130 may run on one Local Area Network (LAN) and may be incorporated into the same physical or logical system, or different physical or logical systems. Alternatively, the commerce platform 110, merchant user device 120, and user device 130 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform 110 provides financial processing services to one or more merchants, such as the merchant for which the use of user device 120 is performing onboarding. Such financial processing services can include, for example, managing accounts, running financial transactions, clearing transactions, performing payouts to agents, tracking tax information, managing merchant and/or agent accounts, as well as other services typically associated with commerce platforms systems such as, for example, STRIPE™. However, before providing such services, the merchant user device 120 and user device 130 participate in an onboarding process in which a user of the merchant user device 120 initially interacts with the commerce platform 110 to provide account data. Such account data includes, for example, an account type, an account owner, an account name, authorized users, banking information, credit processing information, tax reporting information, corporation information, account preferences, etc. In embodiments, however, not all possible account information is required in order to utilize the services of the commerce platform. That is, a minimum set of account data, which is less than all possible account data collectable by the commerce platform 110, may be associated with a compliance requirement of the commerce platform 110. In other words, a subset of all possible account data given an account type may be associated with a compliance state for a new account of that type such that once a minimum of the account data that brings the new account into the compliance state is received by the commerce platform 110 during account onboarding, the associated account is enabled to use the services of the commerce platform 110. For example, once a new merchant account at the commerce platform 110 has provided the minimum set of account data necessary to satisfy the minimum compliance state for a merchant account type (e.g., as opposed to a minimum compliance state and associated account data for an agent account type, authorization network account type, etc.), the merchant may run transactions using the commerce platform 110, use the merchant to clear transaction with, for example, authorization network systems (e.g., banking systems, credit card brand systems, etc. not show in FIG. 1), sign up merchant affiliated agents for providing services on behalf of the merchant, as well as using other services of the commerce platform 110.

In order to avoid obscuring the embodiments of the present invention, the below description will focus on providing onboarding user interfaces and secure sharded onboarding user interfaces for onboarding merchant accounts that include requirements for collecting sensitive information of specific users associated with the account being opened. However, the embodiments discussed herein are not limited to onboarding merchant accounts, and instead can be utilized for onboarding any number of different account types for the commerce platform 110.

As discussed herein, there may be any number of different types of accounts. For example, there may be a plurality of different merchant account types for different merchants (e.g., privately held corporations, sole proprietorships, public corporations, partnerships, etc.), a plurality of different types of agent accounts (e.g., single accounts associated with a single merchant, an agent that is associated with more than one merchant users of the commerce platform, etc.), a plurality of different authorization network account types (e.g., credit card issuing accounts, card transaction clearance accounts, banking system accounts, etc.), as well as any number of different types of accounts for systems that may utilize the services of the commerce platform 110. In some embodiments, each account at commerce platform 110 is associated with a legal entity, where the legal entity is used to differentiate between account types. For example, a person with an account at commerce platform 110 may be associated with various relevant legal entity types (i.e., an individual, single-member LLC, or sole proprietorship), whereas an account for a business at commerce platform 110 may be associated with various other relevant legal entity types (e.g., non-profit, corporation, multi-member LLC, government entity, etc.). Certain of these account types, in order to satisfy minimum account compliance (e.g. the minimum set of information that will bring the account into compliance and enable a merchant, user, etc. to use the commerce platform system 110 services), may require the collection of a subset of information from specific users associated with beneficial owner(s) of the merchant/account being onboarded. For example, CEO information, company founder information, majority shareholder information, etc. may be required to be collected in order to satisfy the minimum compliance requirements. However, such users are often reluctant to share personal and sensitive information with other users (e.g., a user of merchant user device 120) during account onboarding, where such other users may be a first/initial onboarding user associated with an account, as discussed in greater detail herein. Furthermore, such users for which sensitive personal information is to be collected, without guarantees of security and privacy in the communication of such information, are further reluctant to transmit, share, or otherwise disseminate the sensitive information over unsecure communications channels due to threat of interception. Additionally, such users are often not the first/initial onboarding user, and having the first/initial onboarding user collect the information from the subset of users (e.g. account beneficial owners) often requires the first/initial onboarding user to perform a manual, labor intensive, and insecure offline process to collect the sensitive information of the required information. Finally, having one or more of the subset of specific uses perform an automated process within an existing onboarding may also be undesirable, as it may expose other account users' information or account details to a potentially untrusted source. Embodiments of the techniques discussed herein for onboarding specific subsets of users address the efficiency and security lacking in prior approaches when seeking to collect sensitive information from subsets of specific users associated with accounts being onboarded in networked computing environments.

In embodiments, commerce platform 110 is configured to dynamically generate one or more onboarding user interfaces that collect a subset of merchant account data. In embodiments, the subset of account data is a subset of all possible account data that can be collected by commerce platform 110 during account onboarding, but which is a minimum number/amount/type of data that satisfies compliance requirements for a new account, updated account, account type change, etc. In embodiments, the data associated with the compliance requirements can include one or more of data that is legally required to be collected by the commerce platform 110 (e.g., data defined by related regulations that commerce platform 110 is to collect before providing services to a merchant), data that is logically required to be collected by the compliance platform 110 (e.g., data that commerce platform 110 will use, at a minimum, to provide services to a merchant and establish merchant accounts), data that is required to be collected through a financial, partnerships, or other relationship, as well as some combination of compliance related account data. Because the onboarding focuses on collection of the subset of account data, which is minimum account data that is needed to satisfy a compliance state for a new account, the time of the onboarding process is reduced, network bandwidth consumed during onboarding is consequently reduced by providing the minimized onboarding process, and complexity in the development and participation in the onboarding process is also reduced.

Furthermore, and in embodiments when the minimum subset of account data includes sensitive personal information (e.g. date of birth, home address, personal telephone number, social security numbers, copies of passports, copies of drivers licenses, type of identification used during onboarding, as well as other potential sensitive information of specific users), commerce platform 110 utilizes secure techniques for sharded onboarding that collects the sensitive information directly from the specific user, for example a user of user device 130, in parallel with onboarding performed with an initial onboarding user of merchant user device 120. That is, while the first, initial onboarding user is participating in an onboarding process by interacting with a series of dynamic account onboarding user interface, one embodiment of which is discussed more fully in U.S. patent application Ser. No. 16/725,584, filed on Dec. 23, 2019, titled "Systems and Methods for Dynamic Interface Generation for Commerce Platform Onboarding", the contents of which are incorporated herein by reference, a sharded onboarding process is pursued by the commerce platform 110 directly with the user for which sensitive account information is to be collected. The onboarding of such a user and collection of their sensitive information is referred to herein as sharded because a partition or separation is enforced by handing over responsibility for account information collection from the initial onboarding user of merchant user device 120 to commerce platform system 110 to collect such account information directly from the user of user device 130.

As will be discussed in greater detail below, commerce platform 110, during the onboarding of the merchant account associated with the merchant user device 120 determines, based on an account type being opened and account compliance requirements associated with the account type, whether specific user account data is required, such as CEO information, shareholder information, founder information, etc. Then, during onboarding performed by the merchant user device 120, a minimal and non-sensitive subset of account information identifying the specific user (e.g., CEO, shareholder, founder, etc.) is collected, such as name, email address, phone number, etc. In embodiments, commerce platform system 110 takes over the onboarding (e.g. collection of the subset of information from the specific user) by directly communicating with the user, such as with user device 130, by sending the user device a secure, one-time-use, and short lived/expiring link with a unique identifier embedded within the link (e.g., https://cp.com/onboard_ceo/dkj001doiu374zp315 having a set validity period, such as 1 hour, 6 hours, 12, hours, 24 hours, etc.). In one embodiment, the unique identifier is a bearer token or other cryptic string of significant length and sufficient entropy to ensure the unique identifier cannot be guessed or predicted by outside or other nefarious actors, such as bearer tokens generated using OAuth, script commands, or other techniques. Furthermore, in embodiments, commerce platform 110 may include, among other processing resources, a hardware chip, secure processor, trusted platform module, etc. configured to generate a cryptographically secure unique identifier (e.g., via a hardware random number or cryptographic generator). Furthermore, in embodiments, a total length of the unique identifiers generated by commerce platform 110 increases as the total number of generated unique identifiers increases.

When the link is selected by a user of the user device 130, commerce platform 110 generates and serves one or more secure application programming interface (API) based web pages, such as sharded onboarding user interface 132, linked via the unique identifier in the link to only the specific user being onboarded and associated with user device 130. The web page user interfaces, such as sharded onboarding user interface 132 and as discussed in greater detail below, further utilize secure communications channels, such as hypertext transfer protocol secure (HTTPS), and utilizes a unique and ephemeral API key when communicating with the commerce platform 110 to ensure that the user of user device 130 is limited to access rights only to providing account information associated with the subset of sensitive account information (e.g., protects against accessing other account details, such as account routing number, other contact information etc., as a safeguard against interception within network 102). These are technical solutions, as discussed herein, that provide guarantees of privacy and security when the specific user providing their sensitive information is being onboarded, such as securing that user's personal information from interception, unwanted sharing, or exposure, by using secure communications channels, scoped account information collection, short-lived authorizations, etc.

After collecting the subset of account data from the initial onboarding user, including the sensitive subset of account data from the specific user(s), as discussed in greater detail herein, the merchant account is brought into minimum compliance, and can thereafter use the service provided by the commerce platform 110. In embodiments, a merchant may later supply additional account data as desired and/or required.

Figure 2:
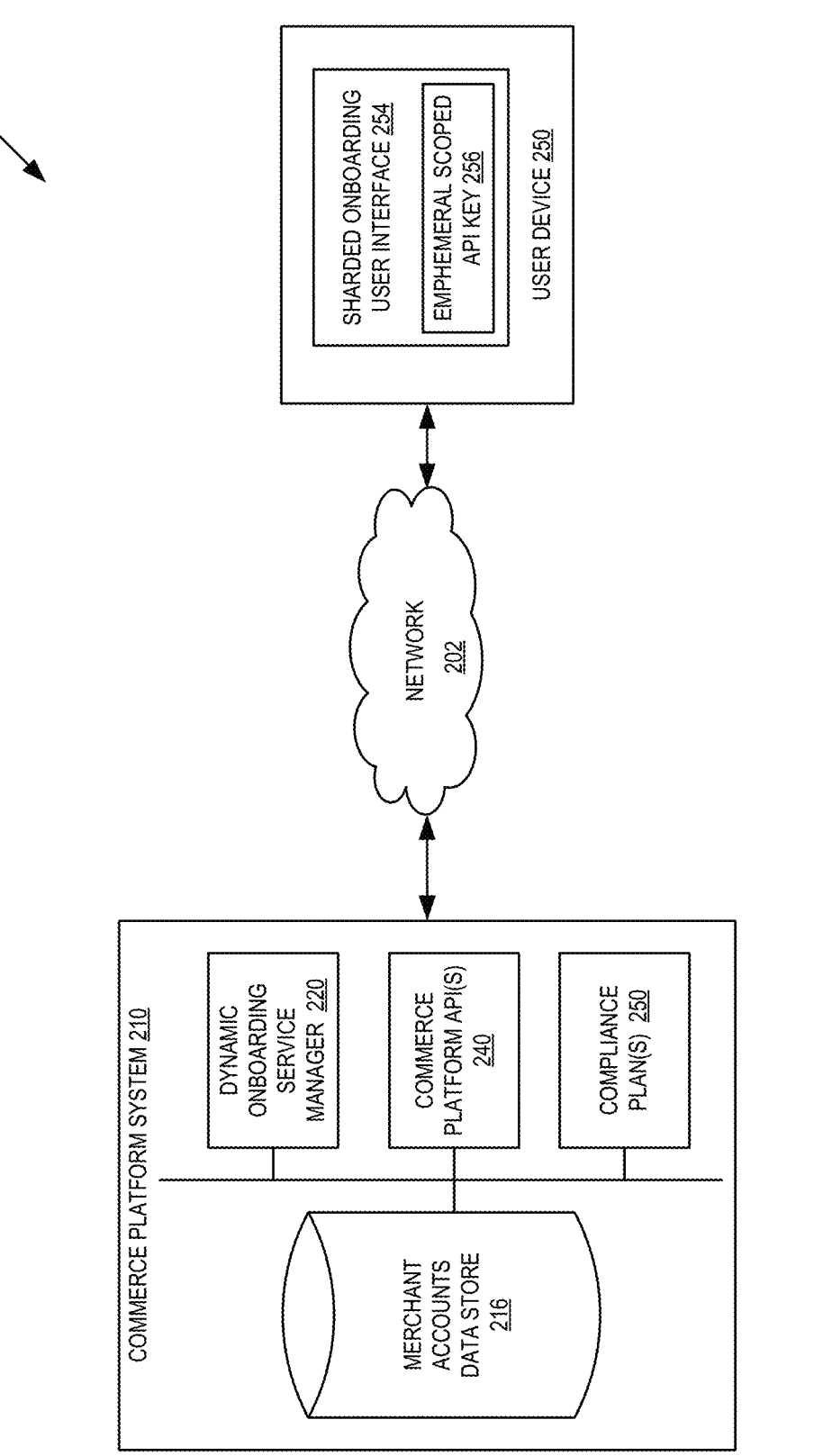
FIG. 2 is a block diagram of one embodiment of a commerce platform providing a sharded onboarding user interface to a user device for secure collection of a subset of account information.

FIG. 2 is a block diagram of one embodiment 200 of a commerce platform system 210 providing a sharded onboarding user interface to a user device 250 for secure collection of a subset of account information. Commerce platform system 210 and user device 250 provide additional details for the corresponding devices/systems discussed above in FIG. 1.

In one embodiment, commerce platform 210 includes a dynamic onboarding service manager 220, one or more commerce platform application programming interfaces (APIs) 240, one or more compliance plans 250, and an accounts data store 216. User device 250, which may be any merchant user device 130 associated with a specific user for which a subset of sensitive information is to be collected, includes a sharded onboarding user interface 254 rendered by the user device 250, for example within a web browser, mobile web browser, application, mobile app, etc. running on user device 250.

As discussed above, another user device, such a merchant user device 120, will initiate the establishment of an account with commerce platform 210 to enable the use of services provided by the commerce platform 210 by the merchant. For example, and to illustrate embodiments of the present invention, the initial account opening user device may be a user device associated with a merchant system that is being used to create/onboard a merchant account for using payment processing services of the commerce platform 210. The account may be a new account, an expansion of an existing account, or other account addition/modification for which onboarding may occur to collect information required to satisfy minimum compliance requirements. Furthermore, in embodiments, the commerce platform 210, initial onboarding user device (not shown), and user device 250 communicate with each other over various networks and network configurations as discussed above in FIG. 1. In an embodiment, dynamic onboarding service manager 220 may generate one or more of user interfaces, such as a web based user interface, which are transmitted to the initial opening merchant user device (e.g., merchant user device 120) offering to establish a new account, expand an existing account, modify an account, etc. at commerce platform 210. In embodiments, the web based user interfaces generated by dynamic onboarding service manager 220 collect a minimum set of account data required to bring an account being onboarded into a compliance state, as discussed in greater detail in U.S. patent application Ser. No. 16/725,584, filed on Dec. 23, 2019, titled "Systems and Methods for Dynamic Interface Generation for Commerce Platform Onboarding", the contents of which are incorporated herein by reference.

In an embodiment, during onboarding performed by the initial merchant user device (e.g. device 120), an account type being onboarded, account user associated with the account being onboarded, etc. is determined by the compliance plan 250 (e.g., account requirements associated with account types supported by the commerce platform system 210). As discussed herein, specific types of users, such as beneficial account owners, associated with the account being onboarded based on the compliance plan, account type, user type, or a combination of factors may be required to supply a subset of sensitive information in order to bring an account into compliance. Furthermore, the specific types of users can include, for example, CEOs, other corporate officers, shareholders, as well as any other user associated with the account being onboarded for which a subset of sensitive account information is to be collected. In an embodiment, after a non-sensitive set of initial information for such users is collected by the commerce platform system 210 during the initial onboarding process, a sharded onboarding process is initiated by the dynamic onboarding service manager 220. The sharded onboarding processes onboards the specific users directly (e.g., responsibility for information collection from the specific users is transferred from the initial account onboarding, which may continue in parallel with the sharded onboarding, to the commerce platform system 210, until an account is brought into minimum compliance). In an embodiment, the non-sensitive set of initial information may include at least the specific user's name and a contact information (e.g. email address, mobile phone number, etc.). In an embodiment, additional information associated with such a user may also be collected by the initial account onboarding user, such as work address, work contact information, etc.

In either embodiment, after the specific user is identified, dynamic onboarding service manager 220, or commerce platform API(s) 240 in response to a request of the dynamic onboarding service manager 220, which are a set of software routines, packages, etc. that implement the internal and external services of the commerce platform system, allocate a person object in the accounts data store 216 and associates the allocated object with the account being opened. The person object is a database or other data object allocated to hold the information to be collected from the specific user. Furthermore, the person object is associated in the merchant accounts data store 216 with the merchant account so that information received into the person object may be used to satisfy compliance requirements for the merchant account being established. The initial collected information may then be used to populate data fields of the person object.

After the person object is allocated for the specific user, dynamic onboarding service manager 220 continues with the sharded onboarding of the specific user by generating a secure link. In an embodiment, link generation includes generating a unique identifier, such as generating a bearer token using OAuth based techniques to provide guarantees of security from prediction, inference, or brute force computation, and associating that unique identifier with the person object allocated for the specific user. The unique identifier is also allocated a validity period, such as 1 hour, 2 hours, 12 hours, 24 hours, 2 days, etc. Then, dynamic onboarding service manager 220 generates a link that includes the unique identifier embedded therein, and which resolves at the commerce platform system 210 when selected. The link is then transmitted by the dynamic onboarding service manager 220 to user device 250 using the initially collected contact information (e.g., the contact information identifying the specific user of the user device 250).

In embodiments, because the link includes the unique ID, upon selection by user device 250, dynamic onboarding service manager 220 or an API endpoint executing one or more commerce platform APIs 240 receives the link selection. The link selection may then be processed to parse the link for the unique ID to first determine whether the link is still valid (e.g. within the validity period), has not been used before (e.g., ensures only single link usage), and optionally may perform other forms of identity verification (e.g., matching IP address lookup locations with information known about the user to, for example, determine if a CEO's business address is in California but a link selection has occurred in New York, New Delhi, etc. indicating potential fraud). When the link selection is determined to be invalid, dynamic onboarding service manager 220 may regenerate a new ID, and resend the link to user device 250.

When the selected link is determined to be valid, dynamic onboarding service manager 220 first generates a scoped API key. In embodiments, the scoped API key is another unique identifier, cryptographic key, etc. that is used when exchanging API based messages with endpoints executing commerce platform APIs 240. That is, the API key is received in API based messaging, and verified against a stored API key to ensure message authenticity. In embodiments, for example, the API key in a message may be matched against a stored API key purported to be associated with the messenger. In other embodiments, the API key may be a public key that is used to encrypt the API based message, and for which the commerce platform system 210 uses a corresponding private key to decrypt the message to verify authenticity. In either embodiment, the API key is further scoped to the person object and given a validity period (e.g., like the secure link above, the API key is also ephemeral). That is, any API based messaging using the API key only provides access to updating the person object (e.g. supplying the subset of sensitive information). Any other nefarious access, such as access to account records, the ability to change account number or settings, etc., is prevented as the scoped key will not provide access to these features.

Dynamic onboarding service manager 220 then generates a specific API based user interface for the specific user associated with the person object. The specific API based user interface is referred to as specific because it includes the scoped API key limiting access to only the person object. Furthermore, it is referred to as specific because it is generated to collect only the subset of sensitive information from the user for which the person object was created. In other words, the subset of information limited to the user is a minimum set of information associated with the user (e.g. a specific type of user and associated information) that is required to bring an account into compliance with respect to that user's information. As discussed herein, the remaining account information is collected by another, initial account opener (e.g. an initial onboarding user associated with merchant user device 120). Dynamic onboarding service manager 220 then transmits the generated graphical user interface, including the scoped API key, via a secure communications channel to user device 250

Figure 3:
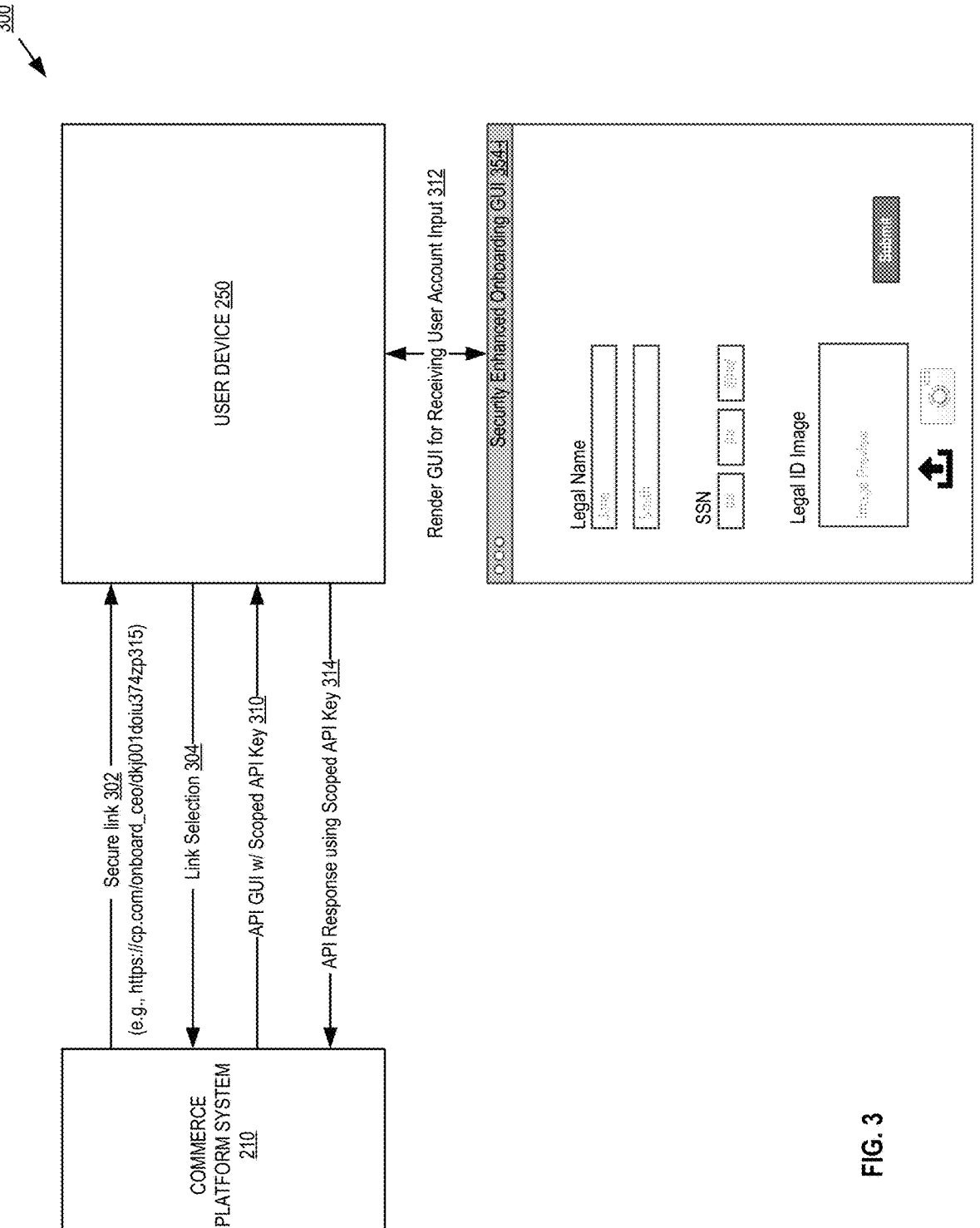
FIG. 3 is a block diagram of another embodiment of a commerce platform providing a sharded onboarding user interface to a user device for secure collection of a subset of account information.

User device receives the graphical user interface, such as a web page, data to populate an application, etc., and renders the sharded onboarding user interface 254, which stores the ephemeral scoped API key 256 for use during API based messaging. The sharded onboarding user interface, an example of which is illustrated as user interface **354-*i* in FIG. 3, is limited because it is used to collect only the required subset of information directly from the user. Then, once collected, it can be submitted via an API message using the scoped API key transmitted from the user interface 254 to an API endpoint executed by one or more of the commerce platform API(s) 240. The commerce platform API(s) may then parse the API messages (e.g., a post, put, etc. API call that when received and validated by an API endpoint causes the editing the person object) to verify the API key's validity period, identity, and optional factors, as discussed above. Furthermore, once verified, the ephemeral scoped API key may also be used to verify the scope of the request (e.g., supplying the requested information for the person object), such as ensuring the request received by the commerce platform API(s) 240** are directed to the account and person object for which the API key was generated.

Dynamic onboarding service manager 220 may then determine, from the received information, whether additional information should be collected from the specific user associated with the user device 250. If additional information is to be collected, one or more additional user interfaces may be generated and transmitted to the user device 250, as discussed above, so that the user device 250 may render and respond with the requested information.

In embodiments, a user or user device may seek to terminate an onboarding session before all required account information is collected. In embodiments, dynamic onboarding service manager 220 may then generate one or more user interfaces to set up account, password pairs, receive additional contact information for performing multiple factor authorizations, etc., when the user returns to perform account onboarding for their specific subset of information. By adding the additional authentication factors for subsequent onboarding, additional guarantees of security may be established by commerce platform system 210.

FIG. 3 is a block diagram of another embodiment 300 of a commerce platform providing a sharded onboarding user interface to a user device for secure collection of a subset of account information. In the embodiment, the messages exchange between the commerce platform system 210 and the user device 250 discussed herein are illustrated. It is assumed in FIG. 3 that an initial account onboarding user has specified an account type, user type, etc. for a merchant account being established, updated, etc., and thus requiring the collection of sensitive information from a specific user (e.g. a second merchant user other than the initial, first onboarding merchant user), and thus suitable for collection via sharded onboarding as discussed herein. Thus, as discussed herein commerce platform system 210 will generate a person object for the specific user, and associate that person object with the account being created, updated, expended, etc. After generating a unique identifier, which is associated with the person object and given a validity period, commerce platform system 210 transmits a secure link (e.g. https://cp.comionboard_ceo/dkj001doiu374zp315) to the user device identified in the initially collected contact information for the person object. As discussed herein, the link is secure because it can be transmitted via secure communications channels, using secure communication protocols, etc., is valid for a set time, and is provided with the unique identifier. Commerce platform system 210 then transmits 302 the secure link to the user device 250.

User device 250 receives the link, such as in an email messages, a text message, a multimedia message, or other message. User device 250 then transmits 304 a link selection back the commerce platform system 210, such as by selecting the link causing the user device to request the resource from the commerce platform system identified by the link.

Commerce platform system 210 upon receiving the link selection parses the link to extract the unique identifier to determine to which specific person object the link selection is directed. Furthermore, additional verifications, such as link validity, determining the link has not been used previously, and additional verifications can be determined.

When the link is still valid, commerce platform system 210 generates an ephemeral scoped API key. As discussed herein, the API key is ephemeral because it is also associated with a period of validity. The API key is scoped because it is associated with the account to which the specific user and person object is being onboarded to. The commerce platform system 210 then transmits 310 an API based graphical user interface (GUI) with the scoped API key to the user device.

User device 250 renders the GUI, which is illustrated as security enhanced onboarding GUI 354-*i*. The GUI 354-*i* as illustrated, shows example types of sensitive user information, such a social security number, an image of a legal ID (e.g., drivers license, passport, etc.), etc., that may be collected via the security enhanced GUIs upload features (e.g., imaging, filing uploading, etc.). When the information is entered into the GUI 354-*i*, user device transmits 314 an API based response (e.g., a put, post, or other API call) and uses the ephemeral scoped API key in the call as an authentication of the call.

Commerce platform system 210, which as discussed above can include on or more API endpoints to receive and process API calls, verifies the received API key (e.g., validity, identity, and scope). When the API key is verified, the commerce platform system 210 can update the corresponding person object associated with the verified API key, for example in the merchant accounts data store 216. The message exchange, e.g., transmissions 310 and 314, may then continue until the information required by the person object is obtained.

In embodiments, the sharded onboarding of the specific user, which occurs while the remaining onboarding is handled by an initial onboarding user, ensures that the specific user providing their own specific information is provided with guarantees of safety within the networked computing environment. More specifically, the secure link (e.g., ephemeral and linked via a unique ID only the allocated person object associated with the account being onboarded), provides guarantees to the specific user that they are the intended link target. Additionally, the secure link provides guarantees of security to the commerce platform system 210 and the merchant performing onboarding, by ensuring that only the specific person may update the person object. In the event the secure link is intercepted by a nefarious actor, the merchant's account information is secure from discovery and/or tampering due to the scoped nature of the secure link and the resulting scoped API key. Additionally, the interception of the link by a malicious third party oftentimes involves a compromise of a secure channel that the account opener would otherwise have used to collect and share information to begin with if not using the techniques discussed herein. That is, if the account opener would have otherwise directly emailed a specific user (e.g., CEO) of the merchant being onboarded to get a social security number, the compromise of the CEO's email would not introduce a new compromise of information to the techniques herein. Because of the security properties of the systems and techniques discussed herein, it is possible and likely that the embodiments of sharded onboarding not only preserves the existing threat model, but decreases a security footprint that both the account opener's organization (and the commerce platform system 210) should consider. Furthermore, a post process verification of the person object information can also detect nefarious actors by checking such information. Thus, the techniques discussed herein provide specific techniques and combinations of security features for enabling the desired guarantees of security to the merchant, the commerce platform, and the specific user being onboarded in interconnected communications environments.

FIG. 4 is a flow diagram of one embodiment of a method 400 for generating one or more user interfaces for onboarding a merchant for use of services of a commerce platform system. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., system 110 or 210) and merchant user device (e.g., merchant user device 120). In embodiments, the method 400 sets up the sharded onboarding discussed herein, and further illustrated and discussed with respect to FIG. 5 below.

Referring to FIG. 4, processing logic of the merchant system begins by requesting a merchant account at the commerce platform system for a merchant account being established or updated (processing block 402). Processing logic of the commerce platform system allocates an account in an account data store (processing block 404), and generates and transmits onboarding users interface(s) the merchant system for collection of merchant account information (processing block 406). Processing logic of the merchant system renders onboarding user interface(s) and replies to the commerce platform system with requested merchant account information requested in the interface(s) (processing block 408).

In embodiments, the account creation, editing, etc. is processed via one or more graphical user interfaces generated by the commerce platform and served to the merchant system, such as dynamic onboarding user interfaces discussed above. Furthermore, the account being established, edited, etc. is one of a plurality of different types of accounts, and thus the user interfaces are dynamically generated to collect a minimum set of information that will bring the new/updated account into legal compliance, juristic compliance, geographic compliance, commerce platform system compliance, or a combination thereof. Thus, in embodiments, processing logic may determine at various stages of generating, transmitting, rendering, and replying (e.g., processing blocks 406 and 408) whether the minimum set of information has been collected (processing block 418). When it has not processing logic can return to processing block 406 to continue the account onboarding.

In embodiments, at processing block 408, an initial onboarding user interacting with the merchant user system may specify a specific account type, specific user type, or a combination thereof. Such specific account types, user types, etc., when compared against the compliance plans maintained by the commerce platform cause processing logic of the merchant user device (e.g. via one or more of the rendered GUIs) to render a GUI that captures initial user information associated with collection of sensitive information from a specific type of user associated with the merchant account (processing block 410). As discussed herein, these may be individuals associated with the merchant, such as CEOs, corporate officers, board members, stockholders, etc., that may be reticent to share such information with the initial account opener. Nevertheless, commerce platform system is required to collect such information for account compliance requirements.

Thus, when such initial information for the specific user (s) is collected, processing logic of the commerce platform receives the request to add a user type associated with the collection of sensitive information, as well as the initial user information for the specific user associated with the request and initial information (processing block 412). Processing logic allocates a record in an accounts data store including a person object (processing block 414). In embodiments, once the person object is allocated, the initial information associated with the specific user can be entered and stored in the person object. For example, the specific person's name, email address, phone number, as well as other information (e.g., that information that is in possession of the initial onboarding merchant user).

Processing logic then performs a sharded onboarding process for the specific user while the remaining onboarding continues (processing block 416). In embodiments, processing logic advances back to processing block 406 so that additional onboarding may be performed in parallel with the sharded onboarding.

Figure 5:
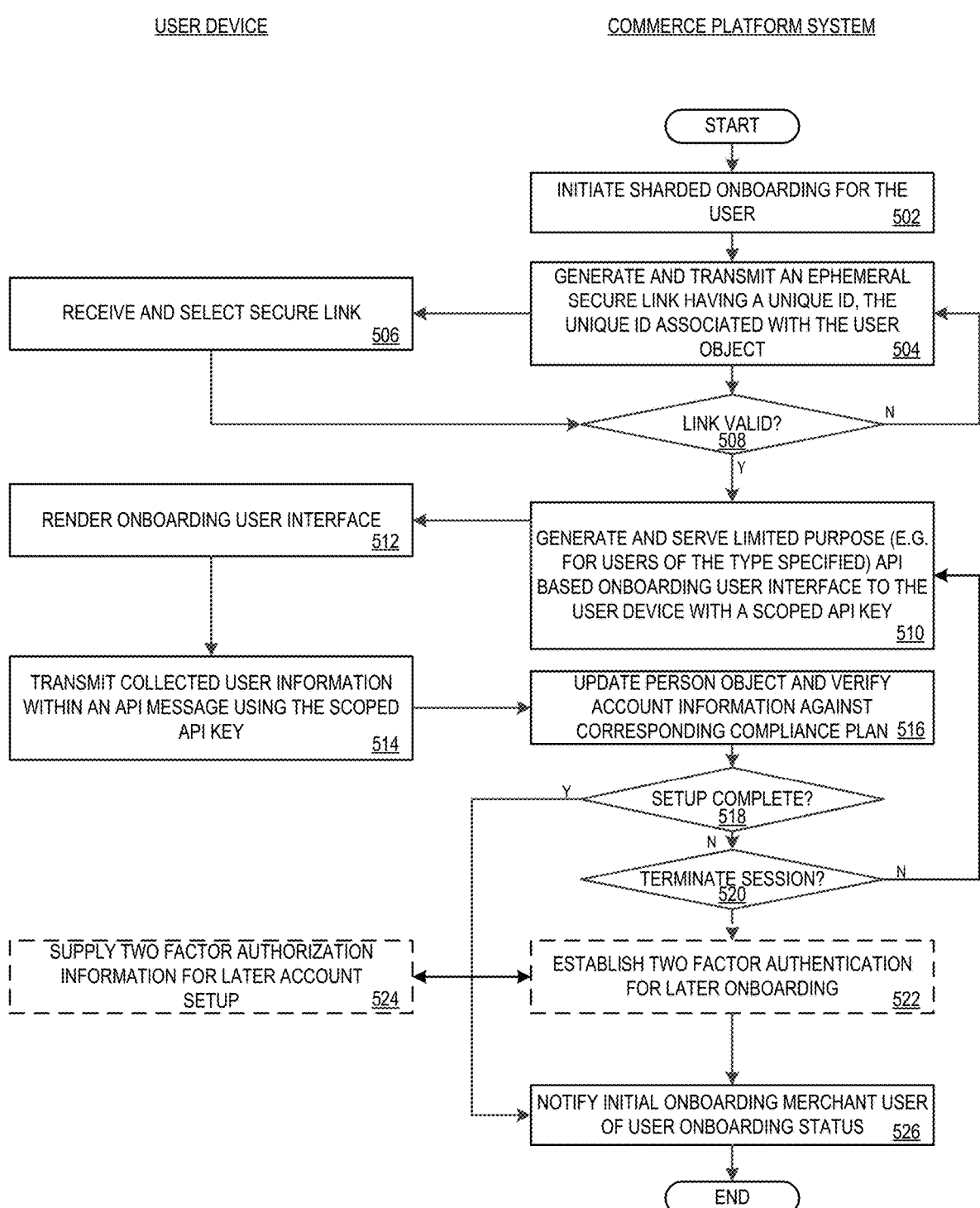
FIG. 5 is a flow diagram of another embodiment of a method for generating and using sharded onboarding user interfaces for secure collection of a subset of account information when onboarding a merchant for use of services of a commerce platform system.

FIG. 5 is a flow diagram of another embodiment of a method 500 for generating and using sharded onboarding user interfaces for secure collection of a subset of account information when onboarding a merchant for use of services of a commerce platform system. The method 500 is performed by processing logic that may comprise hardware (circuitry, dedicated logic, etc.), software (such as is run on a general purpose computer system or a dedicated machine), firmware, or a combination. In one embodiment, the method 500 is performed by a commerce platform system (e.g., system 110 or 210) and user device (e.g., user device 130 or 230). In embodiments, the method 500 is performed to collect sensitive information from a specific user independent of onboarding of a remainder of merchant account information. In other words, control of onboarding the specific user is passed from the initial onboarding merchant user system to the commerce platform system.

Referring to FIG. 5, processing logic of the commerce platform system begins by initiating the sharded onboarding process for the user (processing block 502). The user is the specific user for which the sensitive information is to be directly collected from, and which is a different user from the initial onboarding user of the merchant user device. Processing logic generates and transmits an ephemeral secure link having a unique identifier (ID), where the unique identifier is associated with the user object (processing block 504), for example as generated in FIG. 4 and as discussed herein. In embodiments, the unique ID is given a validity period, which can be stored in a data object, table or other data storage location of the commerce platform system associating the unique ID with the person object for the account being onboarded.

Processing logic of the user device receives and selects the link (processing block 506). Upon receipt of the link selection, where the link is configured to resolve at the commerce platform system, processing logic of the commerce platform system determines whether the link is still valid (processing block 508). In embodiments, the validity check can include determining whether person object is associated with the unique ID, determining if the link has been used before, determining if the validity period has expired, or a combination. When the link is not valid, processing logic returns to processing block 504 to regenerate and retransmit a new secure link.

However, when the link is determined to be valid, processing logic of the commerce platform system generates and serves a limited purpose (e.g. for users of the specific type based in part on the allocated person object) API based onboarding user interface to the user device with a scoped API key (processing block 510). The scoped API key, as discussed herein, is unique and ephemeral key scoped to the person object and account being onboarded, and that the API based GUI will use when exchanging messages with APIs of the commerce platform system, as discussed above. The user interface is limited in purpose to collecting a subset of the account information for satisfying a compliance plan and that is associated with the specific person, such as the data within the person object allocated for the type of user. In embodiments, a plurality of different person objects may each have a different subset of data to be collected, where the subset of based on type of use. For example, a CEO of a closed corp. person object may have different data to be collected than a majority shareholder of private company person object. Thus in embodiments, the person object for the specific user being onboarded may be used by processing logic to generate the user interface, and associated data collection fields, elements, etc. within the user interface.

Processing logic of the user device renders the received user interface (processing block 512), and transmits the collected user information within an API message (e.g., put, post, etc. API all addressed to a commerce platform system endpoint) using the scoped API key (processing block 514).

Processing logic of the commerce platform, using the received user information, updates the person object and verifies the received account information against a corresponding compliance plan (processing block 516). In embodiments, processing block 516 uses the scoped API key to update the person object. More specifically, the validity period of the key is checked, and when still valid, the person object and account scoped to the specific API key is updated with the received information.

Processing logic can then determine, after the person object has been updated, whether the account setup for the specific user has been completed (processing block 518). In embodiments, this can include processing logic verifying that information collected from the specific person, as specified in a compliance plan or portion of a compliance plan dedicated to such specific user types, is complete. When it is complete, processing logic can generate a notification to the initial onboarding merchant user of the onboarding status (processing block 526), which in this instance is completion of the requirement associated with the specific user.

When not complete, processing logic can further determine whether the session has/is being terminated (processing block 520). For example, the specific user using user device may attempt to close the graphical user interface before all required information is collected. If the session is not being terminated, the process returns to processing block 510 to continue generating and serving API based user interfaces to collect information from the specific user. However, when the session is terminated, processing logic optionally establishes two factor authentication for later onboarding (processing block 522). In an embodiment, this can include processing logic generating and serving an updated graphical user interface to collect, for example a phone number, additional email address, token transmission, etc. to the user device, which supplies or acknowledges the second factor information (processing block 524). Again, processing logic advances to processing block 526 to notify the initial onboarding merchant user of the user onboarding status (processing block 526), which in this case would be incomplete.

Figure 6:
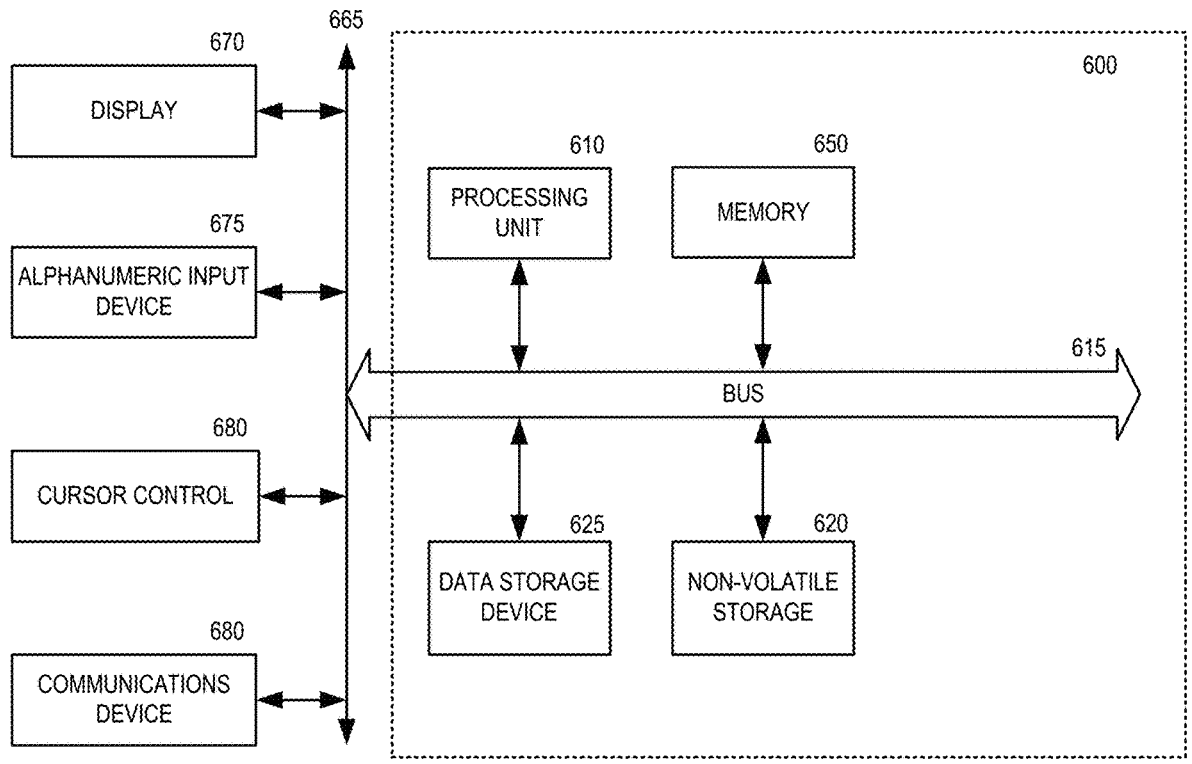
FIG. 6 is one embodiment of a computer system that may be used to support the systems and operations discussed herein.

FIG. 6 is one embodiment of a computer system that may be used to support the systems and operations discussed herein. For example, the computer system illustrated in FIG. 6 may be used by a commerce platform system, a merchant system, etc. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

Figure 7:
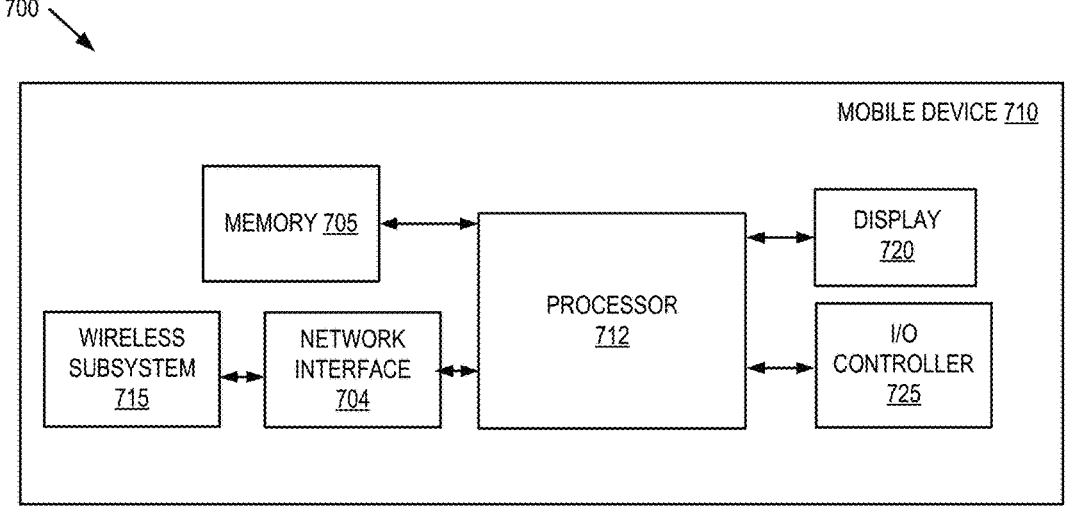
FIG. 7 is one embodiment of a mobile device that may be used to support the systems and operations discussed herein.

FIG. 7 is block diagram of one embodiment 700 of a mobile device. Mobile device 710 may be used, for example, as a merchant user device or user device when interacting with the commerce platform system during onboarding. Furthermore, form components, fields, etc. may be additionally wrapped with tools that adapt their display within a form based on rendering on mobile device 710, as compared to when rendered by computer system 600. For example, when rendered on a mobile device, the user interfaces discussed herein may include larger buttons and inputs. As another example, buttons in footers may be stacked in a mobile rendering as compared to aligned horizontally in a rendering by other computing device.

In one embodiment, mobile device 710 is a system, which may include one or more processors 712, a memory 705, I/O controller 725, network interface 704, and display 720. Mobile device 710 may also include a number of processing modules, which may be implemented as hardware, software, firmware, or a combination. It should be appreciated that mobile device 710 may also include, although not illustrated, a user interface (e.g., keyboard, touch-screen, or similar devices), a power device (e.g., a battery), as well as other components typically associated with electronic devices. Network interface 704 may also be coupled to a number of wireless subsystems 715 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 704 and wireless subsystem 715 couple mobile device 710 to a network.

Memory 705 may be coupled to processor 712 to store instructions for execution by processor 712. In some embodiments, memory 705 is non-transitory. It should be appreciated that embodiments as described herein may be implemented through the execution of instructions, for example as stored in the memory 705 or other element, by processor 712 of mobile device 710 and/or other circuitry of mobile device 710 and/or other devices. Particularly, circuitry of mobile device 710, including but not limited to processor 712, may operate under the control of a program, routine, or the execution of instructions to execute methods or processes in accordance with the embodiments described herein. For example, such a program may be implemented in firmware or software (e.g. stored in memory 705 and/or other locations) and may be implemented by processors, such as processor 712, and/or other circuitry of mobile device 710. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 710 itself and/or some or all of the functions, engines or modules described herein may be performed by another system connected through I/O controller 725 or network interface 704 (wirelessly or wired) to mobile device 710. Thus, some and/or all of the functions may be performed by another system and the results or intermediate calculations may be transferred back to mobile device 710. In some embodiments, such other device may comprise a server, such as commerce platform 110 or 210.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method comprising:

initiating, by a service provider system, a first onboarding for a user type associated with a user account being onboarded to the service provider system, the user account for use of one or more services of the service provider system;

generating, by the service provider system, a secure link comprising a unique identifier associated with a user object allocated for the user type in a data store of the service provider system, the user object being one of a plurality of different types of user object;

transmitting, by the service provider system to a user system of a user of the user type, the secure link for collection of a subset of user data associated with the user object;

in response to receiving user selection of the secure link:

verifying, by the service provider system, that the user selection of the secure link is valid and corresponds to the user of the user system, including determining that the secure link had not been selected before, and in response:

generating, by the service provider system, an application programming interface (API) key comprising the unique identifier that associates the API key with the user object in the data store of the service provider system, and transmitting the API key to the user system;

receiving, by the service provider system from the user system, the API key with information for the subset of user data associated with the user object; and in response to verification that the unique identifier comprised in the API key is associated with the user object, updating, by the service provider system, the user account with the information collected for the subset of user data to satisfy a minimum account compliance requirement for the user type for the user account.

2. The method of claim 1, wherein updating the user account with the information collected for the subset of user data, comprises:

adding the information for the subset of user data received from the user system to the user object associated with the unique identifier in the data store of the service provider system.

3. The method of claim 1, wherein the first onboarding for the user type is performed by the service processing system during a second onboarding for a second user type, and wherein the second onboarding collects a different subset of user data for the second user type.

4. The method of claim 1, wherein verifying that the user selection of the secure link is valid and corresponds to the user of the user system comprises:

performing an identity verification of the user of the user system, wherein performing the identity verification of the user system comprises:

matching an Internet Protocol (IP) address associated with the selection of the secure link with prior known information associated with the user of the user system.

5. The method of claim 1, wherein generating the API key comprising the unique identifier further comprises:

generating a period of validity for the API key; and updating the user account with the information collected for the subset of user data when the information is received (i) with the API key comprising the unique identifier and (ii) during the period of validity.

6. The method of claim 1, further comprising:

in response to receiving the user selection of the secure link, extracting the unique identifier from the secure link;

generating a secure API based user interface for the user based on the user object associated with the unique identifier extracted from the secure link and associated with the user object in the data store of the service provider system; and transmitting, by the service provider system, the secure API based user interface with the API key to the user system causing the user system to render the secure API based user interface to the user for collection of the subset of user data.

7. The method of claim 1, wherein verification that the unique identifier comprised in the API key is associated with the user object, comprises:

determining that the API key received with the information matches the API key generated by the service provider system; and in response to determining the match, updating the user object with the information for the subset of user data.

8. The method of claim 1, wherein the user account is a first type of user account among a plurality of different types of user account, wherein the subset of user data associated with the user object is defined based on a compliance plan associated with the first type of user account, and wherein the compliance plan comprises an indication of the user object and the subset of information to be collected from the user as part of satisfying the minimum account compliance requirement for the user type for the user account.

9. The method of claim 1, wherein the first onboarding is initiated after an initial onboarding of the user account by an initial user, different from the user.

10. The method of claim 9, further comprising:

receiving, from a second user processing system used by a second user during the initial onboarding of the user account, second information associated with the user;

transmitting, by the service provider system, the secure link to the user system used by the user; and receiving, by the service provider system, the user selection of the secure link from the user system.

11. A non-transitory computer readable storage medium including instructions that, when executed by a processor, cause the processor to perform operations comprising:

initiating, by a service provider system, a first onboarding for a user type associated with a user account being onboarded to the service provider system, the user account for use of one or more services of the service provider system;

generating, by the service provider system, a secure link comprising a unique identifier associated with a user object allocated for the user type in a data store of the service provider system, the user object being one of a plurality of different types of user object;

transmitting, by the service provider system to a user system of a user of the user type, the secure link for collection of a subset of user data associated with the user object;

in response to receiving user selection of the secure link:

verifying, by the service provider system, that the user selection of the secure link is valid and corresponds to the user of the user system, including determining that the secure link had not been selected before, and in response:

generating, by the service provider system, an application programming interface (API) key comprising the unique identifier that associates the API key with the user object in the data store of the service provider system, and transmitting the API key to the user system;

receiving, by the service provider system from the user system, the API key with information for the subset of user data associated with the user object; and in response to verification that the unique identifier comprised in the API key is associated with the user object, updating, by the service provider system, the user account with the information collected for the subset of user data to satisfy a minimum account compliance requirement for the user type for the user account.

12. The non-transitory computer readable storage medium of claim 11, wherein updating the user account with the information collected for the subset of user data, comprises:

adding the information for the subset of user data received from the user system to the user object associated with the unique identifier in the data store of the service provider system.

13. The non-transitory computer readable storage medium of claim 11, wherein generating the API key comprising the unique identifier further comprises:

generating a period of validity for the API key; and updating the user account with the information collected for the subset of user data when the information is received (i) with the API key comprising the unique identifier and (ii) during the period of validity.

14. The non-transitory computer readable storage medium of claim 11, wherein the user account is a first type of user account among a plurality of different types of user account, wherein the subset of user data associated with the user object is defined based on a compliance plan associated with the first type of user account, and wherein the compliance plan comprises an indication of the user object and the subset of information to be collected from the user as part of satisfying the minimum account compliance requirement for the user type for the user account.

15. The non-transitory computer readable storage medium of claim 11, wherein verifying that the user selection of the secure link is valid and corresponds to the user of the user system comprises:

performing an identity verification of the user of the user system, wherein performing the identity verification of the user system comprises:

matching an Internet Protocol (IP) address associated with the selection of the secure link with prior known information associated with the user of the user system.

16. A service provider system, comprising:

a memory; and a processor coupled with the memory configured to:

initiate a first onboarding for a user type associated with a user account being onboarded to the service provider system, the user account for use of one or more services of the service provider system;

generate a secure link comprising a unique identifier associated with a user object allocated for the user type in a data store of the service provider system, the user object being one of a plurality of different types of user object;

transmit, to a user system of a user of the user type, the secure link for collection of a subset of user data associated with the user object;

in response to receipt of a user selection of the secure link:

verify that the user selection of the secure link is valid and corresponds to the user of the user system, including determining that the secure link had not been selected before, and in response:

generate an application programming interface (API) key comprising the unique identifier that associates the API key with the user object in the data store of the service provider system, and transmit the API key to the user system;

receive, from the user system, the API key with information for the subset of user data associated with the user object; and in response to verification that the unique identifier comprised in the API key is associated with the user object, update the user account with the information collected for the subset of user data to satisfy a minimum account compliance requirement for the user type for the user account.

17. The system of claim 16, wherein the processor configured to update the user account with the information collected for the subset of user data, comprises the processor further configured to:

add the information for the subset of user data received from the user system to the user object associated with the unique identifier in the data store of the service provider system.

18. The system of claim 16, wherein the processor configured to generate the API key comprising the unique identifier comprises the processor further configured to:

generate a period of validity for the API key; and update the user account with the information collected for the subset of user data when the information is received (i) with the API key comprising the unique identifier and (ii) during the period of validity.

19. The system of claim 16, wherein the user account is a first type of user account among a plurality of different types of user account, wherein the subset of user data associated with the user object is defined based on a compliance plan associated with the first type of user account, and wherein the compliance plan comprises an indication of the user object and the subset of information to be collected from the user as part of satisfying the minimum account compliance requirement for the user type for the user account.

20. The system of claim 16, wherein verifying that the user selection of the secure link is valid and corresponds to the user of the user system comprises:

performing an identity verification of the user of the user system, wherein performing the identity verification of the user system comprises:

matching an Internet Protocol (IP) address associated with the selection of the secure link with prior known information associated with the user of the user system.

\* \* \* \* \*